United States Patent
Fan et al.

(10) Patent No.: US 10,732,456 B2
(45) Date of Patent: Aug. 4, 2020

(54) DISPLAY DEVICE WITH DIFFERENT ELEMENT DENSITIES AND DIRECT-TYPE BACKLIGHT THEREOF

(71) Applicant: HTC Corporation, Taoyuan (TW)

(72) Inventors: Fu-Cheng Fan, Taoyuan (TW); Chung-Jung Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 1 day.

(21) Appl. No.: 15/959,288

(22) Filed: Apr. 23, 2018

(65) Prior Publication Data

US 2018/0335668 A1 Nov. 22, 2018

Related U.S. Application Data

(60) Provisional application No. 62/506,618, filed on May 16, 2017.

(51) Int. Cl.
| | | |
|---|---|---|
| *G02F 1/13357* | (2006.01) |
| *G02B 27/01* | (2006.01) |
| *G06F 3/01* | (2006.01) |
| *G02F 1/1333* | (2006.01) |
| *F21Y 105/12* | (2016.01) |

(52) U.S. Cl.
CPC ..... *G02F 1/133603* (2013.01); *G02B 27/017* (2013.01); *G02B 27/0172* (2013.01); *G02F 1/133602* (2013.01); *G06F 3/011* (2013.01); *F21Y 2105/12* (2016.08); *G02F 2001/133388* (2013.01)

(58) Field of Classification Search
CPC combination set(s) only.
See application file for complete search history.

(56) References Cited

U.S. PATENT DOCUMENTS

| | | | |
|---|---|---|---|
| 8,520,150 B2 | 8/2013 | Yokota | |
| 2006/0290620 A1 | 12/2006 | Chou et al. | |
| 2011/0063338 A1 | 3/2011 | Sedzin et al. | |
| 2012/0086875 A1* | 4/2012 | Yokota | G02F 1/133605 348/790 |
| 2012/0099028 A1 | 4/2012 | Yokota | |

FOREIGN PATENT DOCUMENTS

| | | |
|---|---|---|
| CN | 201607597 | 10/2010 |
| CN | 101839423 | 1/2013 |
| JP | 2007317423 | 12/2007 |

OTHER PUBLICATIONS

"Search Report of Europe Counterpart Application", dated Aug. 22, 2018, p. 1-p. 4.
"Office Action of Taiwan Counterpart Application," dated Jan. 29, 2019, p. 1-p. 7.

* cited by examiner

*Primary Examiner* — Lauren Nguyen
(74) *Attorney, Agent, or Firm* — JCIPRNET

(57) ABSTRACT

A display device and a direct-type backlight thereof are provided. The direct-type backlight includes a central area and a peripheral area. The central area is configured with a plurality of central area light-emitting elements to provide light to a liquid crystal display (LCD) panel. The density of these central area light-emitting elements in the central area is a first density. The peripheral area is configured with a plurality of peripheral area light-emitting elements to provide light to the LCD panel. The density of the peripheral area light-emitting elements in the peripheral area is a second density. Wherein, the second density is less than the first density.

12 Claims, 3 Drawing Sheets

DISPLAY DEVICE WITH DIFFERENT ELEMENT DENSITIES AND DIRECT-TYPE BACKLIGHT THEREOF

CROSS-REFERENCE TO RELATED APPLICATION

This application claims the priority benefit of U.S. provisional application Ser. No. 62/506,618, filed on May 16, 2017. The entirety of the above-mentioned patent application is hereby incorporated by reference herein and made a part of this specification.

BACKGROUND

Technical Field

The invention relates to a liquid crystal display device. More particularly, the invention relates to a head-mounted display device and a direct-type backlight.

Description of Related Art

Liquid crystal display (LCD) device include a LCD panel and a backlight panel. Backlight modules may provide surface light sources to LCD panels, as such, users may conveniently view the images shown by the LCD panels. Generally, the backlight modules may be divided into the direct-type backlight and the side-type backlight. Comparing to the side-type backlight, the direct-type backlight is capable of providing a surface light source of greater brightness. Therefore, when a backlight source is required to provide greater brightness, a direct-type backlight module is adopted most of the time.

SUMMARY

The invention provides a display device and a direct-type backlight thereof for effectively enhancing a contrast of a central area and/or reducing a number of peripheral area light-emitting elements. The display device of the invention may be used in a head-mounted display (HMD) device, and the head-mounted display device may be worn by a user to allow the user to be exposed to a virtual reality environment or an augmented reality environment.

In an embodiment of the invention, a direct-type backlight is provided. The direct-type backlight includes a central area and a peripheral area. A plurality of central area light-emitting elements are disposed in the central area to provide light to a liquid crystal display (LCD) panel. A density of the central area light-emitting elements in the central area is a first density. A plurality of peripheral area light-emitting elements are disposed in the peripheral area to provide light to the LCD panel. A density of the peripheral area light-emitting elements in the peripheral area is a second density, wherein the second density is less than the first density.

In an embodiment of the invention, a display device is provided. The display device includes a LCD panel and a direct-type backlight. The direct-type backlight includes a central area and a peripheral area. A plurality of central area light-emitting elements are disposed in the central area to provide light to the LCD panel. A density of the central area light-emitting elements in the central area is a first density. A plurality of peripheral area light-emitting elements are disposed in the peripheral area to provide light to the LCD panel. A density of the peripheral area light-emitting elements in the peripheral area is a second density, wherein the second density is less than the first density.

In the direct-type backlight provided by the embodiments of the invention, element densities of the light-emitting elements in different areas are different. The element density of the light-emitting elements in the central area that the user is interested in is greater. Hence, a contrast and image performance of the central area may be effectively enhanced in the direct-type backlight provided by the embodiments, and problems such as image sticking in a dynamic image may be improved. The element density of the light-emitting elements in the peripheral area of the direct-type backlight is lower. For instance, the number of the peripheral area light-emitting elements may be reduced in the direct-type backlight provided by the embodiments, so as to lower costs of a direct-type backlight module.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
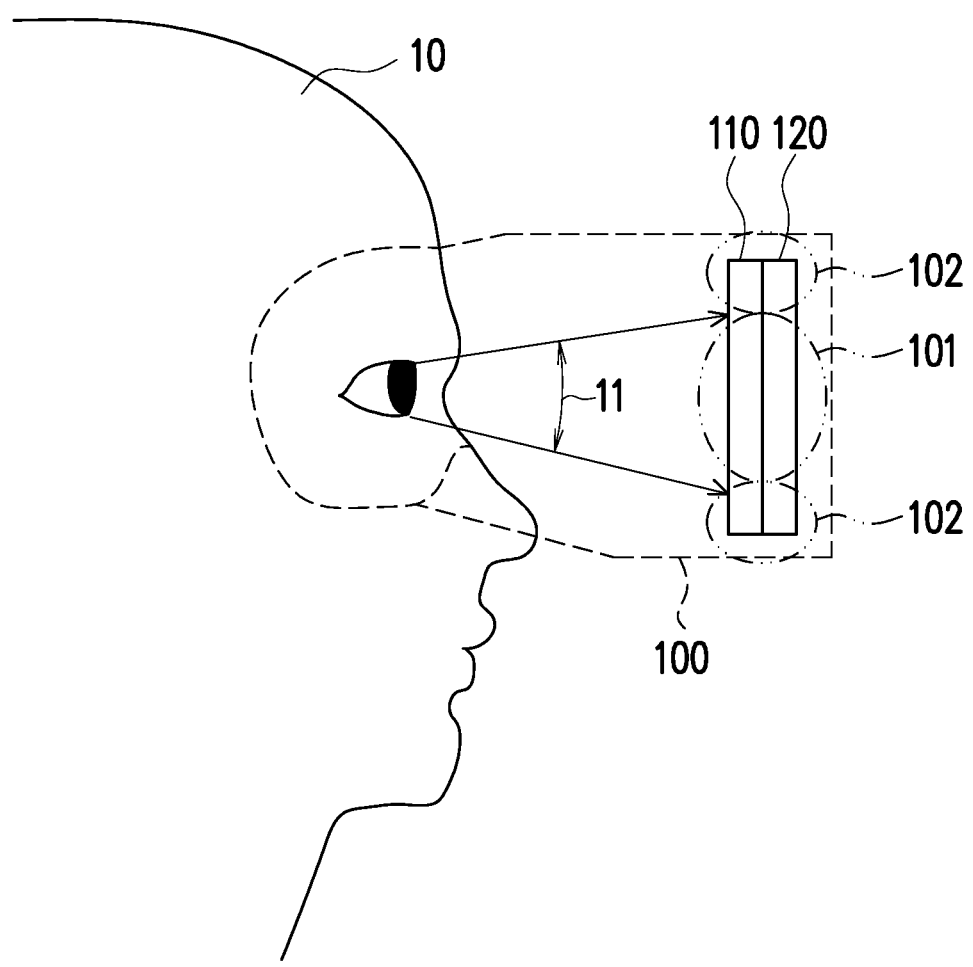
FIG. 1 is a schematic diagram illustrating an application scenario of a display device according to an embodiment of the invention.

The term "coupled to (or connected to)" used in the entire disclosure (including claims) refers to any direct or indirect connecting means. For example, if the disclosure describes a first device is coupled to (or connected to) a second device, the description should be explained as the first device that is connected directly to the second device, or the first device, through connecting other device or using certain connecting means, is connected indirectly to the second device. Moreover, elements/components/steps having same reference numerals represent same or similar parts in drawings and embodiments where possible. Elements/components/steps having same reference numerals or same terms are used as cross reference in different embodiments.

FIG. 1 is a schematic diagram illustrating an application scenario of a display device 100 according to an embodiment of the invention. In the embodiment shown in FIG. 1, the display device 100 may be used in a head-mounted display (HMD) device. That is, the display device 100 may be worn on the head of a user 10, as such, the user 10 may conveniently view an image shown by the display device 100.

The display device 100 includes a liquid crystal display (LCD) panel 110 and a direct-type backlight panel 120. The direct-type backlight panel 120 may provide a surface light source to the LCD panel 110, as such, the user 10 may conveniently view an image shown by the LCD panel 110.

Generally, when the user 10 wears a head-mounted display device including the display device 100 of the invention, the user 10 is exposed to a virtual reality environment or an augmented reality environment. At this moment, a main field of view (FOV) 11 of the user 10 falls on a central area 101 of the LCD panel 110 (a direct-type backlight panel 120). That is, the central area 101 is an area that the user 10 is interested in. Comparing to an image shown in the central area 101, an image shown in a peripheral area 102 of the LCD panel 110 (the direct-type backlight panel 120) is relatively less important.

Figure 2:
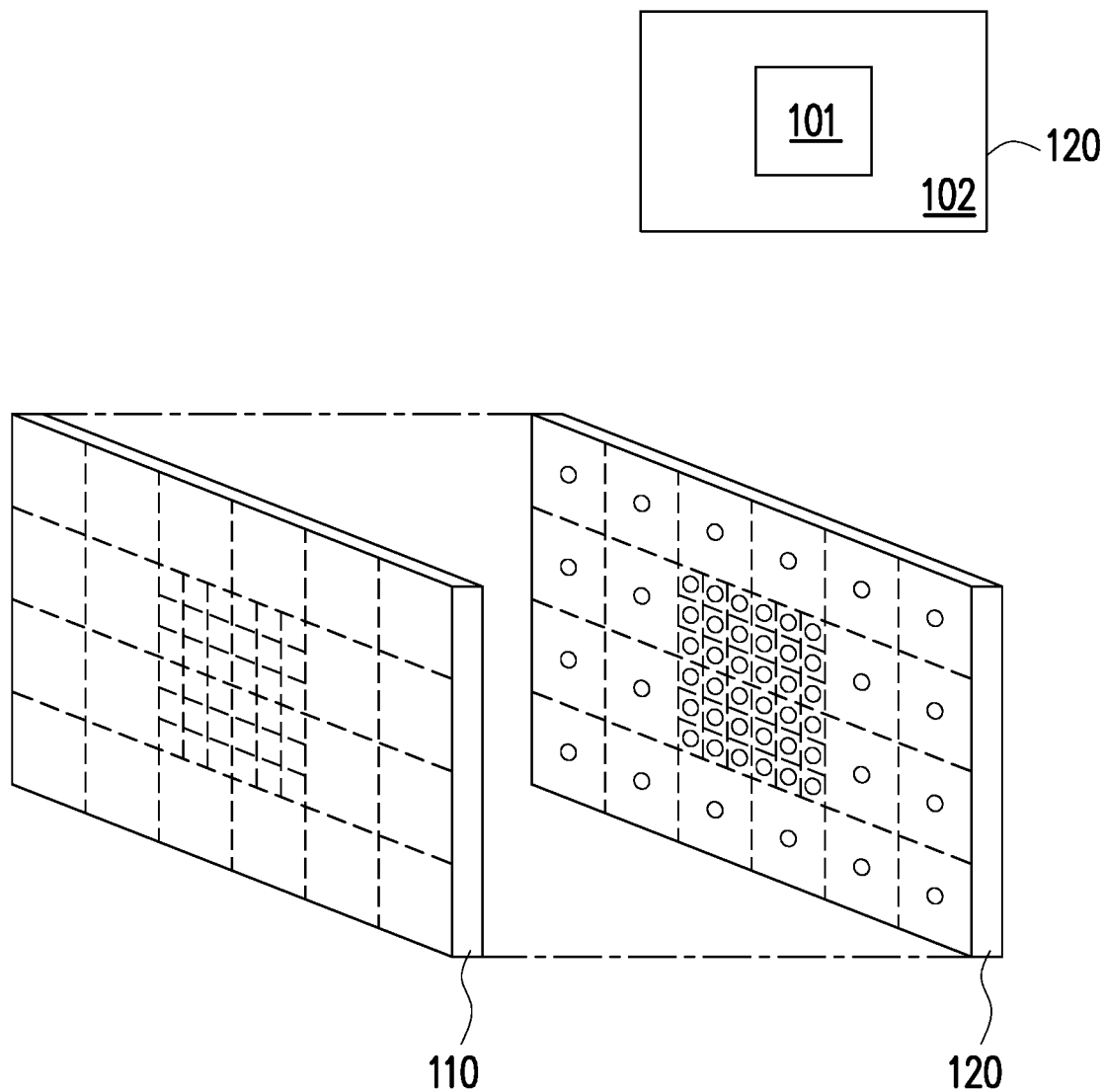
FIG. 2 is a schematic three-dimensional view illustrating the liquid crystal display (LCD) panel and the direct-type backlight panel of FIG. 1 according to an embodiment of the invention.

FIG. 2 is a schematic three-dimensional view illustrating the LCD panel 110 and the direct-type backlight panel 120 of FIG. 1 according to an embodiment of the invention. In the direct-type backlight panel 120 shown in FIG. 2, each dot (small circle) represents one light-emitting element. The light-emitting element may be a light-emitting diode (LED) or other light-emitting element based on design requirement. In the embodiment shown in FIG. 2, the direct-type backlight panel 120 includes the central area 101 and the peripheral area 102. The central area 101 may be defined by the main field of view (FOV) 11 of the user 10. For instance (but is not limited thereto), a range covered by 20 main FOV 11 may be defined as the central area 101.

A plurality of central area light-emitting elements are disposed in the central area 101 of the direct-type backlight panel 120. In the embodiment shown in FIG. 2, the central area 101 of the direct-type backlight panel 120 has 6*6 central area light-emitting elements. The central area light-emitting elements of the central area 101 may provide light to a central area of the LCD panel 110.

A plurality of peripheral area light-emitting elements are disposed in the peripheral area 102 of the direct-type backlight panel 120. In the embodiment shown in FIG. 2, the peripheral area 102 of the direct-type backlight panel 120 has 6*4-2*2 peripheral area light-emitting elements. The peripheral area light-emitting elements of the peripheral area 102 may provide light to a peripheral area of the LCD panel 110.

A density of the central area light-emitting elements in the central area 101 is a first density, and a density of the peripheral area light-emitting elements in the peripheral area is a second density, wherein the second density is less than the first density. In other words, element densities of the light-emitting elements in different areas of the direct-type backlight panel 120 are different. The element density of the light-emitting elements in the peripheral area 102 of the direct-type backlight panel 120 is lower. For instance, a number of the peripheral area light-emitting elements may be reduced, so as to lower costs of the direct-type backlight panel 120. The element density of the light-emitting elements in the central area 101 that the user 10 is interested in is greater. Hence, a contrast and image performance of the central area 101 may be effectively enhanced in the direct-type backlight panel 120, and problems such as image sticking in a dynamic image may be improved.

Figure 3:
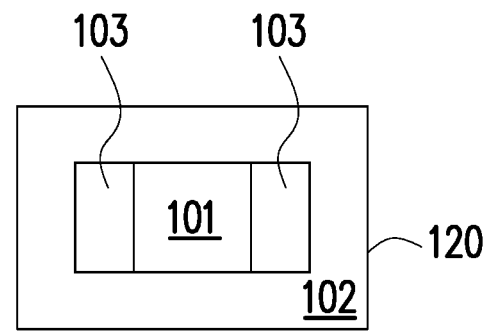
FIG. 3 is a schematic three-dimensional view illustrating the LCD panel and the direct-type backlight panel of FIG. 1 according to another embodiment of the invention.
Figure 3:
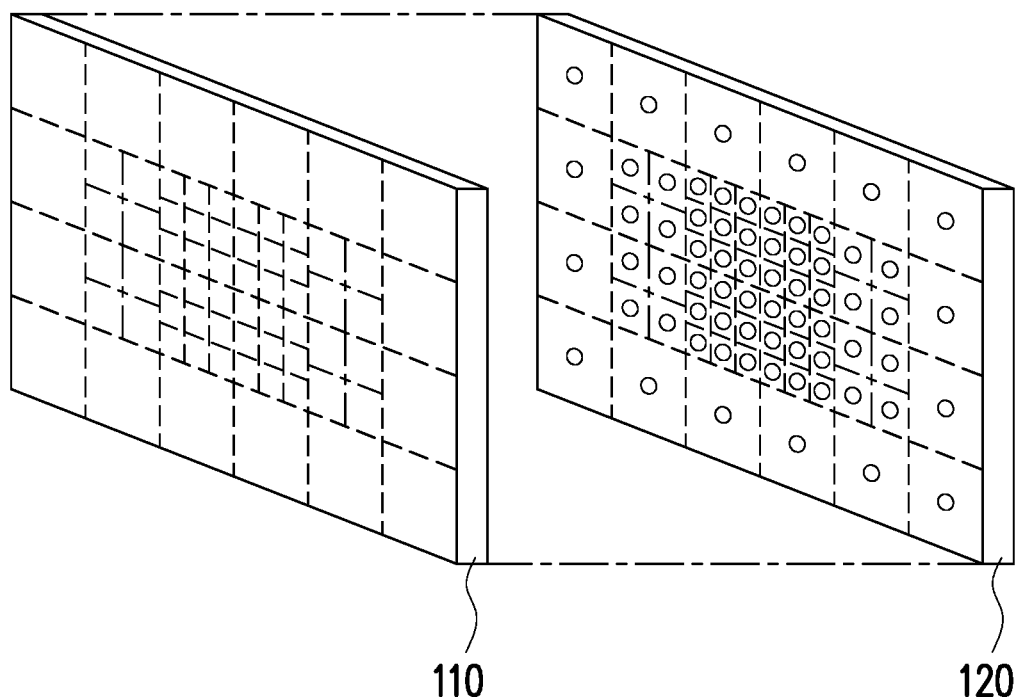

FIG. 3 is a schematic three-dimensional view illustrating the LCD panel 110 and the direct-type backlight panel 120 of FIG. 1 according to another embodiment of the invention. In the direct-type backlight panel 120 shown in FIG. 3, each dot (small circle) represents one light-emitting element. The light-emitting element may be a LED or other types of light-emitting element based on design requirement. In the embodiment shown in FIG. 3, the direct-type backlight panel 120 includes the central area 101 and the peripheral area 102. Since the descriptions of the central area 101 and the peripheral area 102 illustrated in FIG. 3 may be deduced from the descriptions of FIG. 2, no further explanation is provided hereinafter.

The direct-type backlight panel 120 further includes a or a plurality of first areas 103. The first areas 103 are disposed between the central area 101 and the peripheral area 102. A plurality of first area light-emitting elements are disposed in each of the first areas 103. In the embodiment of shown in FIG. 3, the direct-type backlight panel 120 further includes two first areas 103. 2*4 first area light-emitting elements are disposed in each of the first areas 103.

The first area light-emitting elements may provide light to a corresponding area of the LCD panel 110. A density of the first area light-emitting elements in each of the first areas 103 is a third density, wherein the third density is between the first density and the second density.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A direct-type backlight, comprising:
    a central area, a plurality of central area light-emitting elements being disposed in the central area to provide light to a liquid crystal display panel, wherein a density of all the central area light-emitting elements in the entire central area is a first density; and
    a peripheral area, a plurality of peripheral area light-emitting elements being disposed in the peripheral area to provide light to the liquid crystal display panel, wherein a density of all the peripheral area light-emitting elements in the entire peripheral area is a second density; wherein the second density is less than the first density, and a ratio of the first density to the second density is 9; wherein the first density is uniform in the central area and the second density is uniform in the peripheral area.

2. The direct-type backlight as claimed in claim 1, wherein the central area light-emitting elements in the central area of the direct-type backlight are configured to provide light to a central area of the liquid crystal display panel, and the peripheral area light-emitting elements in the peripheral area of the direct-type backlight are configured to provide light to a peripheral area of the liquid crystal display panel.

3. The direct-type backlight as claimed in claim 1, wherein the central area light-emitting elements and the peripheral area light-emitting elements are light-emitting diodes.

4. The direct-type backlight as claimed in claim 1, wherein the central area is defined by a main field of view of a user.

5. The direct-type backlight as claimed in claim 4, wherein a range covered by 20 main field of view is defined as the central area.

6. A display device, comprising:
    a liquid crystal display panel; and
    a direct-type backlight, comprising a central area and a peripheral area, wherein a plurality of central area light-emitting elements are disposed in the central area to provide light to the liquid crystal display panel, a density of all the central area light-emitting elements in the entire central area is a first density; a plurality of peripheral area light-emitting elements are disposed in the peripheral area to provide light to the liquid crystal display panel, and a density of all the peripheral area light-emitting elements in the entire peripheral area is a second density; wherein the second density is less than the first density, and a ratio of the first density to the second density is 9; wherein the first density is uniform in the central area and the second density is uniform in the peripheral area.

7. The display device as claimed in claim 6, wherein the central area light-emitting elements in the central area of the direct-type backlight are configured to provide light to a central area of the liquid crystal display panel, and the peripheral area light-emitting elements in the peripheral area of the direct-type backlight are configured to provide light to a peripheral area of the liquid crystal display panel.

8. The display device as claimed in claim 6, wherein the central area light-emitting elements and the peripheral area light-emitting elements are light-emitting diodes.

9. The display device as claimed in claim 6, wherein the central area is defined by a main field of view of a user.

10. The display device as claimed in claim 9, wherein a range covered by 20 main field of view is defined as the central area.

11. The display device as claimed in claim 6, wherein the display device is used in a head-mounted display device.

12. The display device as claimed in claim 11, wherein the head-mounted display device is used in a virtual reality environment or an augmented reality environment.

\* \* \* \* \*